United States Patent [19]

Freedman et al.

[11] Patent Number: 4,795,873

[45] Date of Patent: Jan. 3, 1989

[54] LIGHT ENHANCING MEANS FOR MICROWAVE UTENSILS

[75] Inventors: George Freedman, Wayland; Robert F. Bowen, Burlington; Wesley W. Teich, Wayland, all of Mass.

[73] Assignee: Raytheon Company, Lexington, Mass.

[21] Appl. No.: 291,643

[22] Filed: Aug. 3, 1981

Related U.S. Application Data

[63] Continuation of Ser. No. 80,872, Oct. 1, 1979, abandoned.

[51] Int. Cl.$^4$ .............................................. H05B 6/80
[52] U.S. Cl. .................... 219/10.55 E; 219/10.55 F; 219/10.55 R; 99/DIG. 14; 724/96
[58] Field of Search .............. 219/10.55 R, 10.55 M, 219/10.55 F, 10.55 E, 10.55 B, 506; 343/701, 703, 721, 894, 741, 743; 324/95, 96, 121 R, 123 R, 126, 149, 144; 315/34, 150, 248, 267; 313/182, 210, 222, 312, 215, 318, 315, 324; 99/451, DIG. 14

[56] References Cited

U.S. PATENT DOCUMENTS

| | | | |
|---|---|---|---|
| 2,993,973 | 7/1961 | Johnson et al. | 219/10.55 R |
| 3,316,380 | 4/1967 | Pansing | 219/10.55 F |
| 3,974,354 | 8/1976 | Long | 219/10.55 E |
| 4,039,894 | 8/1977 | Gardner, III | 343/701 X |
| 4,088,863 | 5/1978 | Jellies | 219/10.55 E |
| 4,112,833 | 9/1978 | Oda et al. | 219/10.55 EX |
| 4,158,464 | 6/1979 | Bowen et al. | 294/31.2 |
| 4,158,760 | 6/1979 | Bowen et al. | 219/10.55 E |
| 4,301,406 | 11/1981 | Shriner | 343/703 X |

FOREIGN PATENT DOCUMENTS 1133048  7/1962  Fed. Rep. of Germany ... 219/10.55 R

Primary Examiner—Philip H. Leung
Attorney, Agent, or Firm—John T. Meaney; Richard M. Sharkansky; William R. Clark

[57] ABSTRACT

A utensil for supporting microwave heatable material in a microwave oven is provided with a microwave responsive illuminator including a light source connected to a suitable antenna for receiving microwave energy and directing it to the light source. The oven has an energy distributor disposed for varying localized field intensities of microwave energy in the oven to promote uniform cooking of the heatable material. When the localized field intensity of the microwave energy adjacent the antenna rises periodically above a predetermined value, the antenna receives sufficient energy to cause illumination of the light source. When the localized field intensity falls below the predetermined value, the antenna receives insufficient energy for maintaining the illumination and the light source is extinguished. Thus, the energy distributor, in addition to promoting uniform cooking of the heatable material, also causes intermittent illumination or flashing of the light source to enhance attractiveness of the utensil. Further, the use of an antenna to receive varying amounts of microwave energy from the oven eliminates the requirement for sophisticated auxiliary circuitry to produce intermittent illumination or flashing of the light source.

8 Claims, 2 Drawing Sheets

LIGHT ENHANCING MEANS FOR MICROWAVE UTENSILS

CROSS-REFERENCE TO RELATED CASES

This is a continuation of application Ser. No. 080,872, filed Oct. 1, 1979, now abandoned.

BACKGROUND OF THE INVENTION

1. Field of the Invention

This invention relates generally to microwave utensils, and is concerned more particularly with a microwave utensil having illuminating means for enhancing attractiveness of the utensil.

2. Discussion of the Prior Art

A microwave oven generally comprises a resonant cavity wherein microwave energy is directed for heating material disposed within the cavity. Thus, food may be cooked by placing it in a suitable container or utensil made of microwave transparent material, and inserting the utensil into the cavity through an access door. The access door generally is provided with a glass viewing panel having disposed over its inner surface an electrically conductive screen which comprises a wall portion of the oven cavity. Apertures in the screen are of a size suitable for preventing leakage of microwave energy through the glass panel and for permitting observation of the cavity interior during the cooking operation.

Consequently, there has been developed in the prior art microwave cooking ware or utensils having attractive features which enhance saleability of the utensils and present a pleasing appearance when observed through the viewing panel of a microwave oven. Attempts have been made to enhance the attractiveness or eye-catching panel of these features by illuminating them periodically or flashingly during the cooking operation. However, the illuminating means developed for this purpose generally require sophisticated auxiliary equipment and increase the cost of the microwave appliance out of proportion to the function performed.

Therefore, it is advantageous and desirable to provide a microwave utensil with simple and inexpensive means for illuminating attractive features of the appliance during the cooking operation.

SUMMARY OF THE INVENTION

Accordingly, this invention provides a microwave utensil for supporting microwave heatable material, and illuminator means supported on the utensil for activation by microwave energy. The utensil may be disposed in a microwave oven resonant cavity wherein microwave energy of predetermined wavelength is directed for heating the material. An energy distributing means is mounted in the oven for varying the standing wave patterns of microwave energy established in the cavity to promote uniform cooking of the material. As a result, localized field values of the microwave energy in the cavity vary with time, and periodically exceed the value required for activating the illuminator means. Thus, the microwave energy in the cavity, in addition to heating the material supported by the utensil, also periodically causes the illuminator means to produce a flash of illumination. This flashing effect simulates motion of the utensil or other activity taking place with heating of the material, thereby enhancing the attractiveness of the utensil.

The utensil includes container means having wall portions disposed for confining microwave heatable material, and made of microwave permeable material, such as glass or plastic, for examples. Accordingly, the utensil may comprise microwave cooking ware, such as a popcorn maker or a coffee pot, for examples. The illuminator means includes one or more light sources disposed on portions of the utensil made of material transparent or translucent to visible light, such as glass or plastic, for examples. Thus, a light source is periodically activated by microwave energy in the oven cavity, and adjacent portions of the utensil are intermittently illuminated. Consequently, an adjacent portion of the utensil may be provided with a decorative figure of an an or a popular cartoon character which is intermittently illuminated by the illuminator means to simulate motion of the utensil or other activity taking place with heating of the material and thereby enhance the attractiveness of the utensil.

The light source includes a light transmissive envelope having therein ionizable gas, such as neon, for example, and provided with antenna means for collecting microwave energy and directing it into the envelope. The antenna means includes a pair of spaced electrodes immersed in the ionizable gas within the envelope and connected to respective terminal conductors which extend hermetically out of the envelope. Externally of the envelope, the terminal conductors are trimmed to respective lengths corresponding to the predetermined wavelength of the microwave energy and configured to function as an RF antenna. As a result, the terminal means intermittently collect sufficient energy to ionize the gas in the envelope and cause it to flash, without requiring sophisticated auxiliary circuitry.

BRIEF DESCRIPTION OF THE DRAWINGS

For a better understanding of this invention, reference is made in the following more detailed description to the accompanying drawings wherein.

DESCRIPTION OF THE PREFERRED EMBODIMENT

Figure 1:
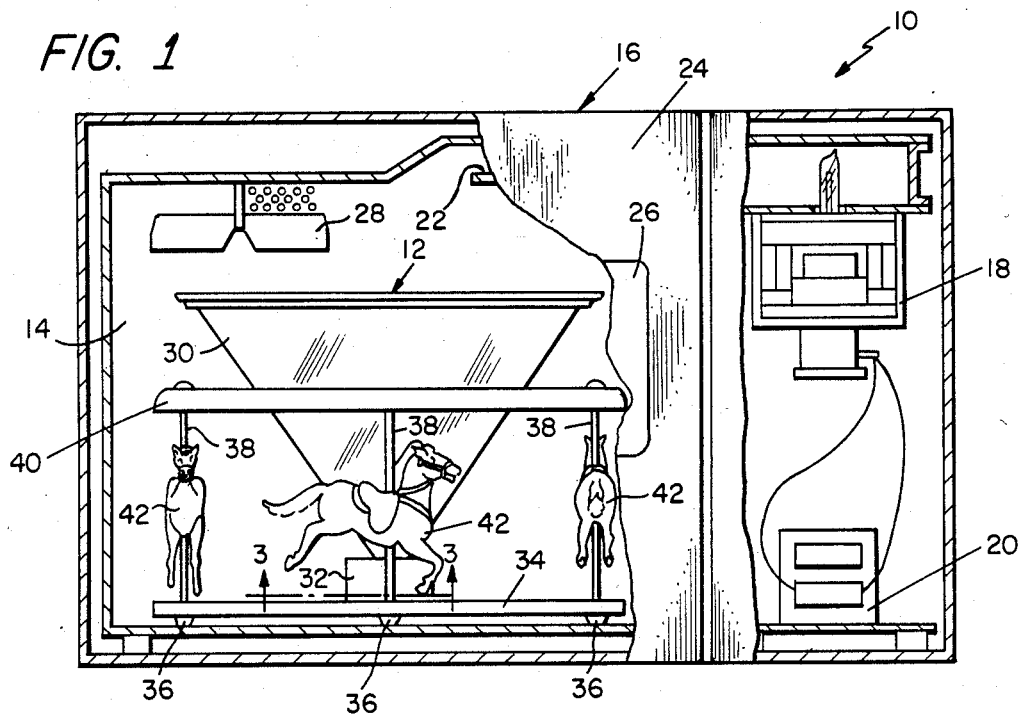
FIG. 1 is a vertical sectional view of a microwave oven having therein a popcorn maker utensil embodying the invention.

Referring to the drawings wherein like characters of reference designate like parts, there is shown in FIG. 1 microwave apparatus 10 comprising a microwave utensil 12 disposed for supporting microwave heatable material in a resonant cavity 14 of a microwave oven 16. The oven 16 is provided with a microwave energy source 18, such as a conventional magnetron tube, for example, which is electrically connected to a suitable power supply 20 for generating microwave radiation having a predetermined wavelength, such as about five centimeters, for example. Source 18 is disposed for directing the generated microwave radiation through a transmission means, such as waveguide 22, for example, and into cavity 14.

The cavity 14 is defined by microwave reflecting walls made of suitable electrically conductive material, such as steel, for example, and including a side access door 24 having therein a glass viewing panel 26. Disposed over the inner surface of panel 26 is an electrically conductive screen (not shown) having apertures of appropriate size for preventing leakage of microwave energy through panel 26 and permitting visual viewing of the interior of cavity 14 when the door 24 is closed. The internal dimensions of cavity 14 are much greater than the wavelength of radiation generated by source 18 and, as a result, the microwave energy entering cavity 14 establishes many different modes of resonance for heating the material supported by utensil 12. However, since these modes of resonance have respective field patterns which are invariant with time, the material supported by utensil 12 may not be heated uniformly. Consequently, the microwave oven 16 preferably is provided with an energy distributing means, such as a mode stirrer device 28 rotatably mounted in the cavity 14, for example. The device 28 cyclically varies standing wave patterns of microwave energy established in the cavity to promote uniform heating of the material supported by utensil 12. As a result, electric intensity values of the microwave energy in localized portions of the cavity 14 vary with time.

The utensil 12 may comprise a carousel type of popcorn maker including an inverted cone shaped container 30 having a large diameter end portion disposed for receiving popcorn seed therein. The convergent walls of container 30 direct and concentrate the seed in an opposing apex end portion of the container for heating by the resonant modes of microwave energy in cavity 14. Consequently, the container 30 is made of microwave permeable material, such as plastic, for example, which preferably also is transparent to visible light so that the heated seed may be observed "popping" within container 30.

The container 30 may be supported axially upright by having the apex end portion thereof secured, by conventional means to a block pedestal 32 which is affixed to a central portion of a disc-like platform 34. The lower surface of platform 34 may be provided with a circular array of spaced bosses 36 which rest on the lower horizontal wall or floor of cavity 14. An annular array of spaced posts 38 have respective end portions attached to the platform 34 and respective opposing end portions attached to a ring 40, which encircles a midportion of container 30. Each of the posts 38 has secured to its midportion a respective decorative figure 42, such as a horse, for example.

Figure 2:
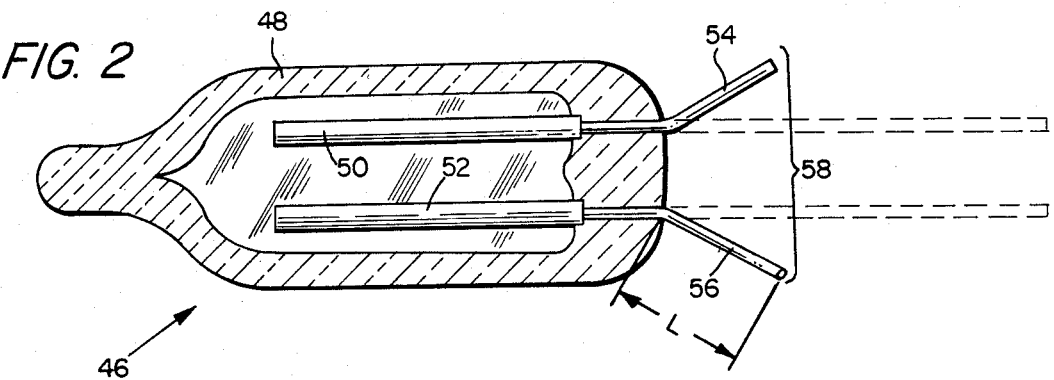
FIG. 2 is an axial view, partly in section, of a lamp modified in accordance with this invention.
Figure 3:
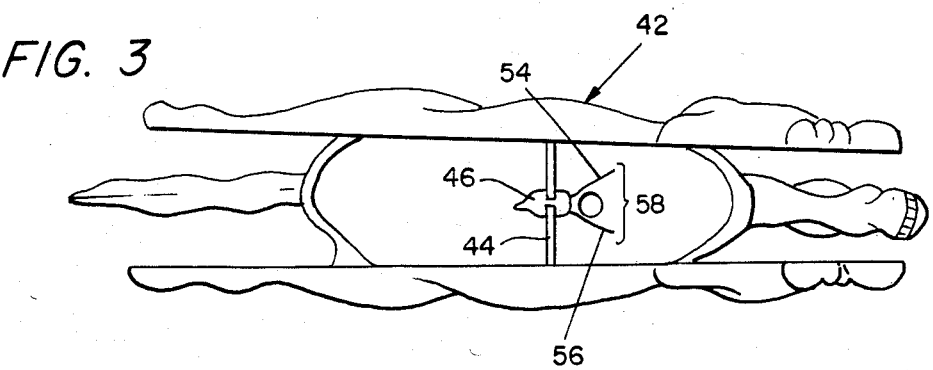
FIG. 3 is a fragmentary transverse view taken along the line 3—3 in FIG. 1 and looking in the direction of the arrows.

As shown in FIG. 3, each of the decorative horse figures 42 may be substantially hollow and have a transverse rib or partition 44 provided with an aperture of suitable size for supporting a light source 46 press-fitted therein. As shown in FIG. 2, each of the light sources 46 may comprise a respective glow lamp including a light transmissive envelope 48 made of dielectric material, such as glass, for example, and having therein a pair of spaced electrodes, 50 and 52, respectively. The electrodes 50 and 52 are immersed in a gas, such as neon, for example, at a pressure suitable for permitting ionization to occur when a microwave induced voltage between the electrodes exceeds a predetermined value. The resulting emission of visible light passes through the surrounding envelope 48 and illuminates adjacent portions of the supporting figure 42. The figures 42 preferably are made of light transmissive material, such as plastic, for example, to enhance attractiveness of the utensil 12 when viewed through the panel 32.

Electrodes 50 and 52 are connected, as by butt-welding, for example, to aligned end portions of respective terminal conductors 54 and 56, which extend hermetically out of an adjacent end of the associated envelope 48. The terminal conductors 54 and 56 of each light source 46 have outer or external portions trimmed to suitable lengths and oriented with respect to one another for constituting a respective antenna means 58. The antenna means 58 of each light source 46 is supported by a respective figure 42 in a localized portion of cavity 14 for receiving microwave wave energy which is directed into the associated envelope 12. The microwave energy, thus received, induces between the electrodes 50 and 52 in the associated envelope 48 a respective voltage. This induced voltage varies in value due to the rotation of mode stirrer 28 causing cyclical variations in the standing waves of microwave radiation in the respective localized portions of cavity 14 and corresponding variations in the electric intensity values of microwave energy therein.

Consequently, the voltage induced between electrodes 50 and 52 of a respective light source 46 periodically exceeds the ionization potential of the gas in the associated envelope 48 thereby causing the light source 46 to produce intermittent flashes of illumination. Since the light sources 46 are supported in an annular array by the respective figures 42, the resulting angular spaced flashes of illumination produce an impression that the carousel type intensil 12 is rotating while the popcorn seed in container 20 is "popping". Thus, the mode stirrer 28, in addition to promoting uniform heating of material supported by the utensil 12, also causes the light sources 46 to produce flashes of visible light which enhance the attractiveness of the utensil 12. Further, the use of the antenna means 58 removes the need of expensive auxiliary circuitry.

The external end portions of terminal conductors 54 and 56 constituting an antenna means 58 are provided with respective lengths "L", which may be measured from the adjacent end of the associated envelope 48 to the outer ends of the conductors, as shown in FIG. 2, for example. If the lengths "L" of terminal conductors 54 and 56 are excessively long, the resulting microwave energy directed into the associated envelopes 48, as described, may be sufficiently large to cause permanent damage to the light sources 46. On the other hand, if the lengths "L" of terminal conductors 54 and 56 are excessively short, the resulting microwave energy directed into the associated envelopes 48, may be inadequate to produce flashing operation of the light sources 46. Therefore, it is preferred that the external end portions of terminal conductors 54 and 56 be provided with respective lengths "L" in the range from about one-quarter to about one-half of the predetermined wavelength generated by source 18 to ensure flashing operation and avoid damaging of the light sources 46. Accordingly, in the described embodiment, the external end portions of terminal conductors 54 and 56 preferably have a respective lengths "L" in the range from about twelve millimeters to about twenty-five millimeters.

Also, the external portions of terminal conductors 54 and 56 may be oriented in reverse relationship with respect to one another to constitute a suitable RF type of antenna. Thus, as shown in FIG. 2, the external end portions of terminal conductors 54 and 56 may be disposed in a common plane and at respective reverse angles, such as seven degrees from their unbent positions, for example, to constitute a "rabbit-ears" type of RF antenna. As an alternative, the external end portions of terminal conductors 54 and 56 may be disposed in a common plane and at respective reverse angles of ninety degrees relative to their inner end portions to constitute a "dipole" type of RF antenna. As another alternative, the external end portions of terminal conductors 54 and 56 may be disposed in a common plane and provided with respective reverse semi-circular contours terminating in a common electrical junction to constitute a "loop" type of RF antenna. Thus, the external portions of terminal conductors 54 and 56 may be configured to provide any type of RF antenna suitable for receiving microwave energy from the oven cavity 14 and directing it into the associated envelope 48.

Figure 4:
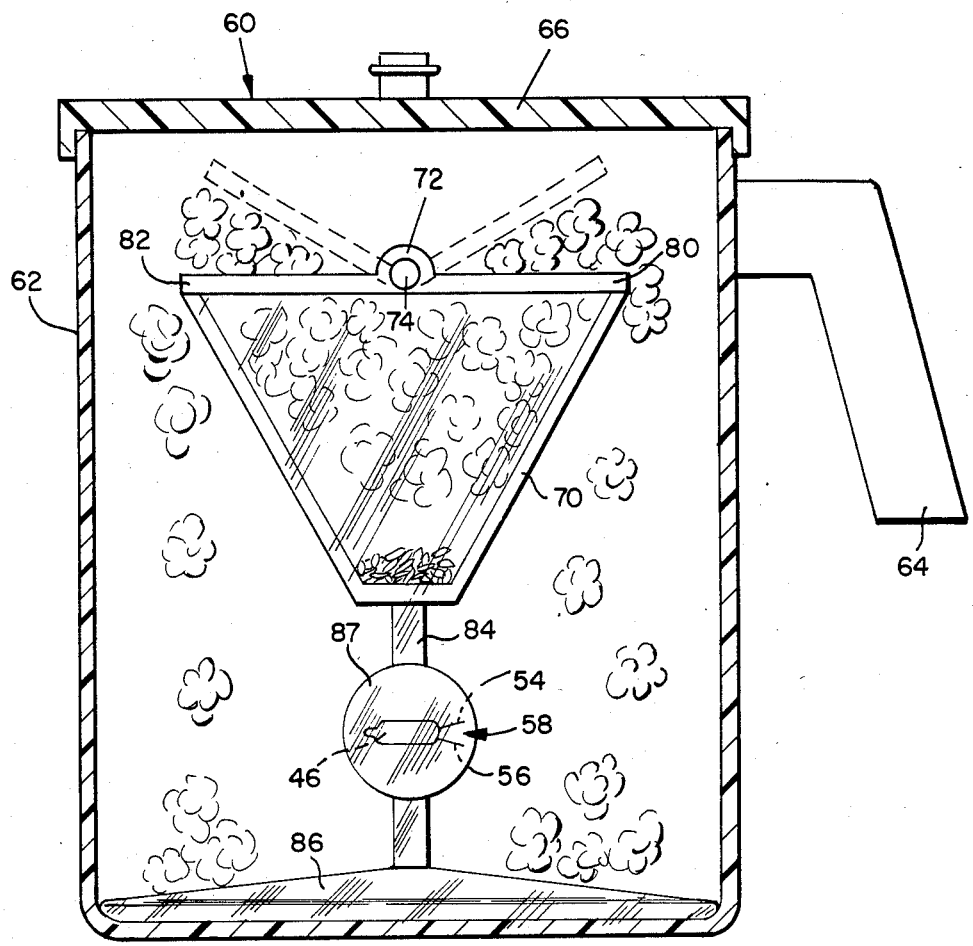
FIG. 4 is a vertical sectional view of an alternative popcorn utensil embodying the invention.

Alternatively, as shown in FIG. 4, the utensil in oven cavity 14 may comprise another type of popcorn maker 60 having a cup-shaped outer container 62 provided with a suitable handle 64 and cover 66. The container 62 is made of a microwave permeable material which transmits visible light, such as clear plastic material, for example. Axially disposed within outer container 62 is an inner container 70 having a general configuration of an inverted hollow cone, and made of a microwave permeable material which also transmits visible light, such as clear plastic material, for example. The large diameter rim of container 70 is provided, as by molding, for example, with diametrically opposed eyelets 72 into which is affixed, as by epoxy bonding, for example, respective opposing end portions of a hinge pin 74. Hinge pin 74 is made of suitable rigid material, such as polysulfone, for example, and extends diametrically across the large diameter open end of container 62. Pivotally mounted, in a conventional manner, on the hinge pin 74 and extending in opposite directions therefrom are respective semi-circular covers, 80 and 82, respectively, which have arcuate peripheral portions overlapping the rim of container 70. Thus, when the respective covers 80 and 82 are closed, arcuate peripheral portions thereof rest on underlying rim portions of the container 70.

Container 70 has an opposing truncated apex end portion which is closed and attached, as by molding, for example, to an adjacent end portion of an upright stem 84. The opposing lower end portion of stem 84 is attached, as by molding, for example, to a disc-like base 86 resting on the inner bottom surface of container 62. Stem 84 has a relatively larger diameter midportion 87 which has a spherical shape and has molded therein a light source 46 similar to the light source 46 shown in FIG. 2 and described in connection with the embodiment shown in FIG. 1. Thus, the light source 46 shown in FIG. 4 also comprises a light transmissive envelope 48 having therein spaced electrodes 50 and 52, respectively, which are immersed in an ionizable gas and connected to externally extending terminal conductors, 54 and 56, respectively. The conductors 54 and 56 comprise an antenna means 58 and have respective external portions trimmed to suitable lengths for ensuring illumination, while avoiding overloading, of the light source 46 by microwave energy in a localized portion of oven cavity 14.

In operation, the closed container 70 having microwave heatable material therein, such as popcorn seed, for example, is placed in outer container 62 which is closed by cover 66. The assembled utensil 60 then is placed in oven cavity 14 by way of access door 24 which then is closed. Microwave source 18 then is energized to establish in the cavity 14 standing waves of microwave energy for heating the popcorn seed in container 62; and the mode stirrer 28 is rotated to vary the standing wave patterns of microwave energy established in oven cavity 14 and thereby promote uniform heating of the popcorn seed. The tapered walls of container 62 direct the popcorn seed into the lower end portion thereof whereby it is concentrated in a clump for more efficient heating by the standing waves of microwave energy. The heated popcorn seed commences to "pop" and exert sufficient pressure against the covers 80 and 82, respectively, to open them and allow the resulting popcorn to spill into the outer container 62. It is preferred that the diameter of base 86 be approximately equal to the inner diameter of container 62, such that the base 86 will substantially cover the inner bottom surface of container 62 and may slidably engage the inner wall surfaces thereof. Thus, the popcorn spilling from inner container 70 into outer container 62 may be readily removed therefrom by lifting the container 70 out of the container 62, whereby the attached base 86 will lift the spilled popcorn out of container 62.

During the heating process, the light source 46 flashes "on" and "off" due to the mode stirrer 28 causing electric intensity variations in the localized portion of cavity 14 adjacent the light source 46. The flashing illumination provided by light source 46 serves as a visual indication of popcorn seed "popping" due to the heating effect of the microwave energy, and intermittently illuminates the resulting popcorn spilling out of container 70 into the container 62. Thus, the light source 46 enhances attractive features of the popcorn maker 60, as observed through the viewing panel 26 in access door 24 during the heating operation.

Figure 5:
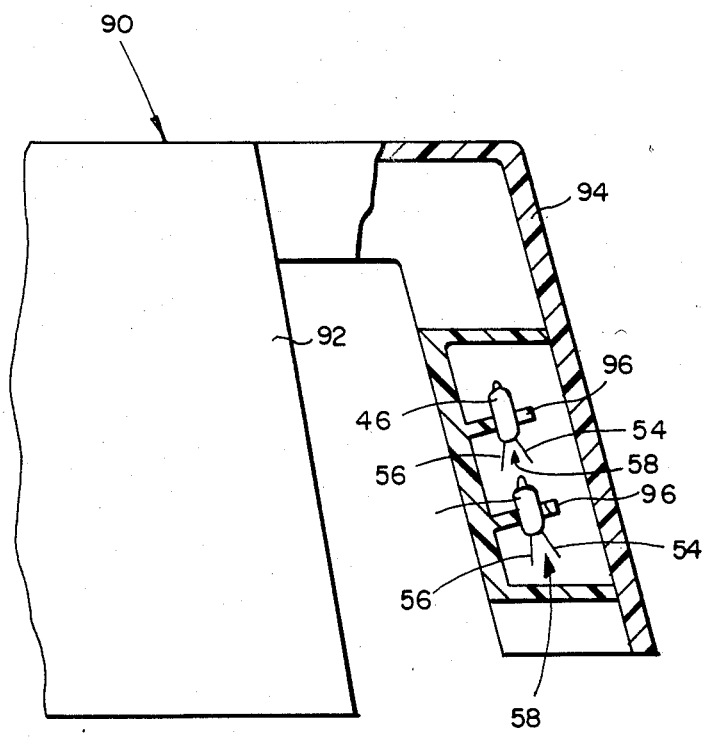
FIG. 5 is a fragmentary elevational view, partly in section, of another utensil embodying the invention.

Alternatively, as shown in FIG. 5, the utensil in oven cavity 14 may comprise a microwave type of coffee maker 90 including a cup-shaped container 92 having a hollow handle 94, and made of a microwave permeable material which transmits visible light, such as plastic, for example. The handle 92 is provided, as by molding, for example, with a plurality of internal support tabs 96, each of which has an aperture or slot of suitable size for supporting a light source 46 pressfitted therein. When the coffee maker 90 has microwave heatable material, such as coffee grounds and water, for example, in the container 92 and is placed in oven cavity 14 for heating by microwave energy, as described, the respective light sources 46 produce flashing illumination which is representative of the coffee making process taking place in container 92. The handle 94 also may be provided with a decorative picture or words, which are illuminated by the flashing light sources 46 within the handle 92. Accordingly, the flashing illumination enhances attractive features of the coffee maker 90 and intermittently illuminates the resulting coffee being made from the initial coffee ground and water ingredients.

Thus, the utensil may comprise any microwave type of cooking ware, and have any type of attractive feature desired, such as words, pictures, or structural figures, for examples. The attractive features of the utensil may be intermittently illuminated by one or a plurality of light sources. Furthermore, the light source may be disposed on the utensil to promote any type of visual impression desired, such as rotating carousels, popping corn, perculating coffee, for examples. Each of the light sources comprises a light transmissive envelope having therein a pair of spaced electrodes immersed in a microwave ionizable gas. Furthermore, the spaced electrodes are connected to respective externally extended terminal conductors which are trimmed to respective lengths suitable to serve as an antenna means for receiving microwave energy from a localized portion of an oven cavity and directing it into the envelope of the light source. Also, the oven cavity is provided with an energy distributor means, such as a mode stirrer, for example, for varying standing wave patterns of microwave energy in the oven cavity to promote uniform heating of material and to cause the light source to produce flashing illumination, without the need of sophisticated auxiliary circuitry. The flashing illumination enhances attractive features of a supporting microwave utensil and provides intermittent illumination for displaying effects produced by the microwave heating process.

From the foregoing it will be apparent that all of the objectives of this invention have been achieved by the structures shown and described herein. It also will be apparent, however, that various changes may be made by those skilled in the art without departing from the spirit of the invention as expressed in the appended claims. It is to be understood, therefore, that all matter shown and described herein is to be interpreted in an illustrative and not in a limiting sense.

What is claimed is:

1. A microwave utensil comprising:
   food supporting means insertable into a microwave oven for supporting food to be processed by microwave radiation in said oven, the food supporting means including container means having side walls disposed for confining said food; and
   means attached to the supporting means for producing light in response to said microwave radiation, the light producing means including antenna means dimensioned for producing flashing operation of said light producing means while exposed to said microwave radiation in said oven.

2. A microwave utensil as set forth in claim 1 wherein the light producing means includes a light source disposed adjacent a decorative portion of the supporting means for directing light thereon in response to microwave energy received from the antenna means.

3. A microwave utensil as set forth in claim 1 wherein the light producing means includes a plurality of light source means connected to said antenna means and disposed in spaced relationship on the supporting means for producing an activity effect.

4. A microwave utensil for use in a microwave oven comprising a material processing cavity disposed for receiving microwave radiation therein, and energy distributor means disposed for varying with time the electric intensity of the microwave radiation in localized portions of the cavity, said microwave utensil comprising: material support means insertable into said oven for processing said material by microwave radiation in said cavity, and illuminating means including predimensioned antenna means secured to the material support means and responsive to the electric intensity of the microwave radiation in the adjacent localized portion of the cavity for producing flashes of light in response to said variations in said electric intensity in said localized portions of the cavity.

5. A microwave utensil as set forth in claim 4 wherein the energy distributor means is rotatably mounted in the cavity for cyclically varying the standing wave modes of microwave radiation.

6. A microwave utensil as set forth in claim 4 wherein the illuminating means includes a light source secured to a selected portion of the support means, and said antenna means is connected to the light source for periodically receiving sufficient microwave radiation to activate the light source.

7. A microwave utensil as set forth in claim 4 wherein the illuminating means includes a plurality of light sources arranged in predetermined spaced relationship and connected to respective antenna means for periodically receiving sufficient microwave radiation to flash in a desired pattern and produce a desired activity effect.

8. A microwave utensil as set forth in claim 7 wherein said respective antenna means are dimensioned for limiting said received microwave radiation and protecting said light sources from overload damage.

* * * * *